Dec. 11, 1951     E. A. DAVIS     2,577,952
DISK PLOW
Filed July 2, 1945     4 Sheets-Sheet 1
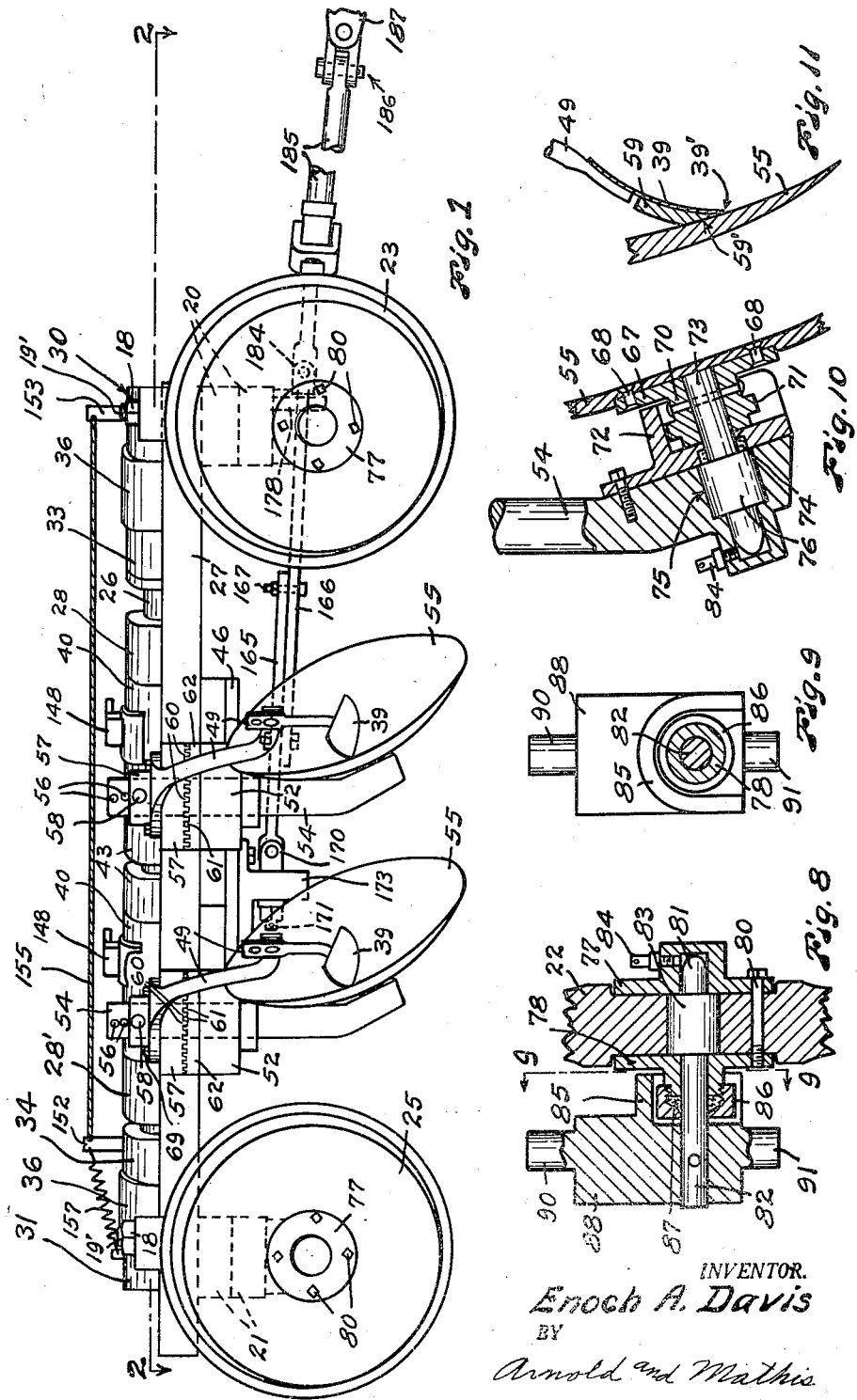
INVENTOR.
Enoch A. Davis
BY
Arnold and Mathis
ATTORNEYS Dec. 11, 1951  E. A. DAVIS  2,577,952
DISK PLOW
Filed July 2, 1945  4 Sheets-Sheet 2
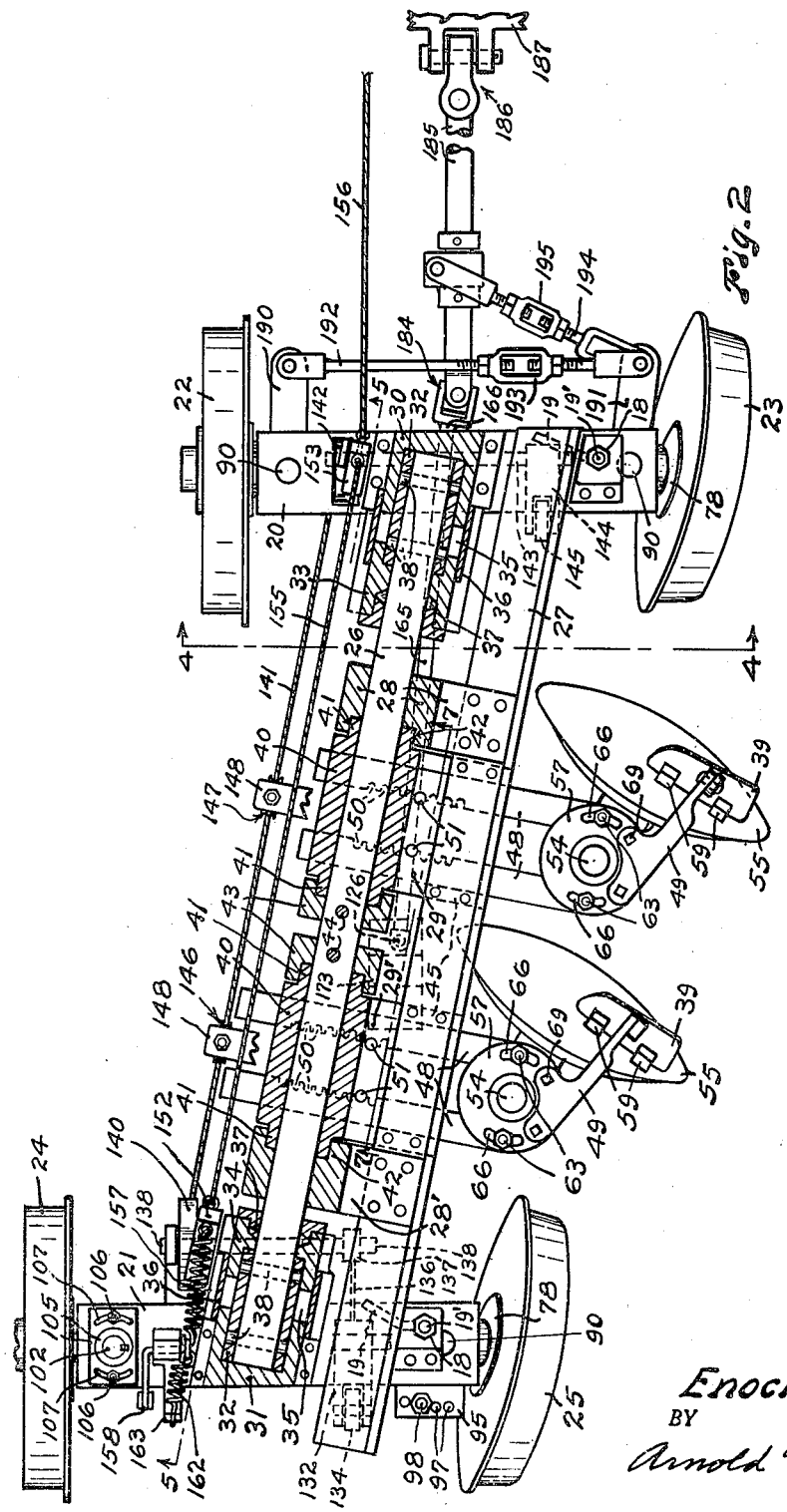
INVENTOR.
Enoch A. Davis
BY
Arnold and Mathis
ATTORNEYS Dec. 11, 1951     E. A. DAVIS     2,577,952
DISK PLOW
Filed July 2, 1945     4 Sheets-Sheet 3
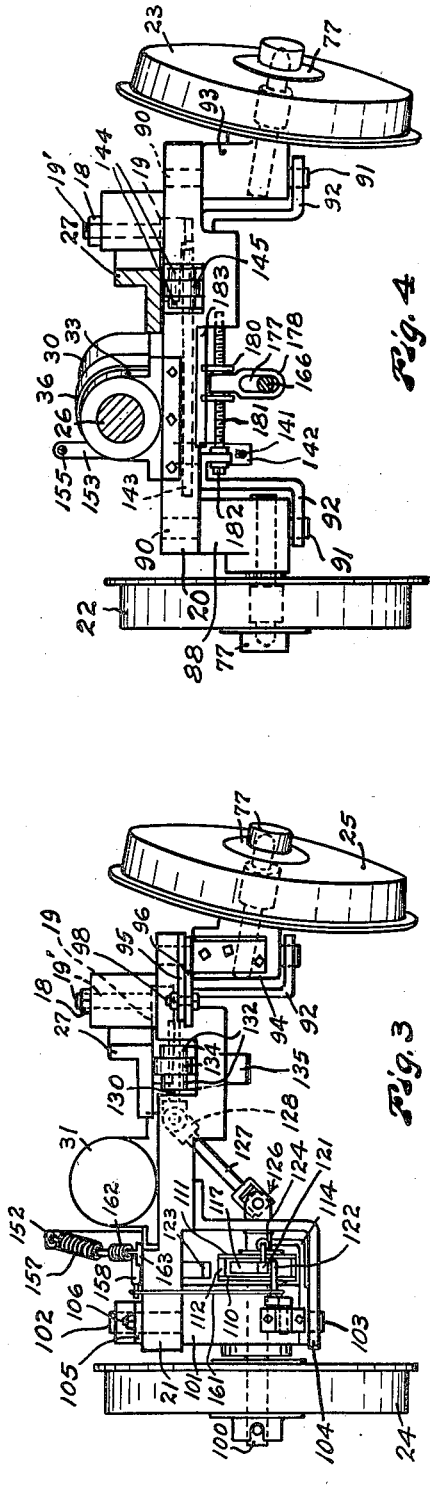
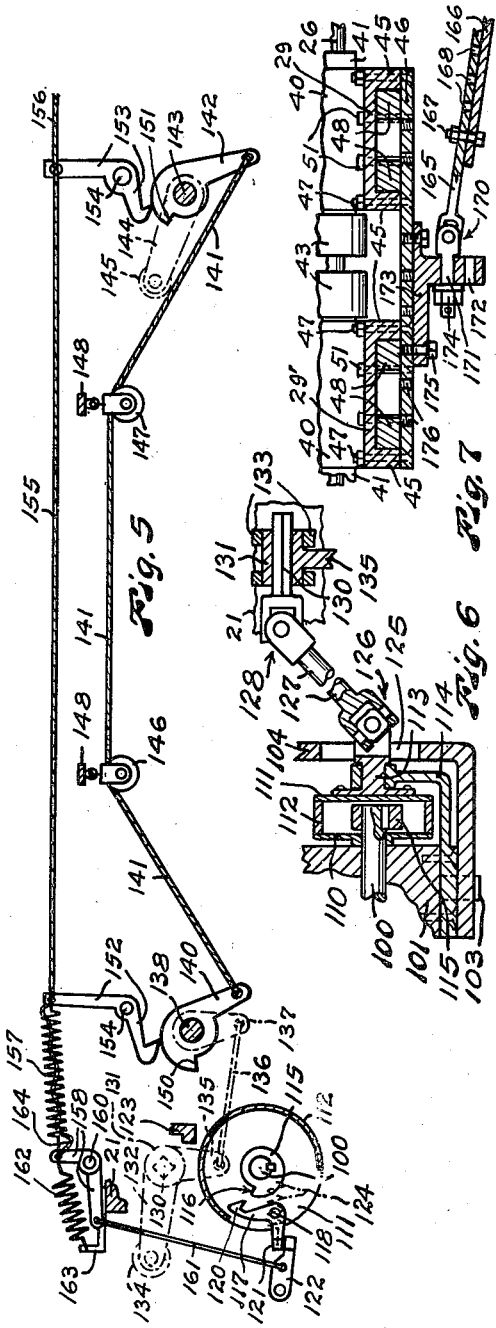
INVENTOR.
*Enoch A. Davis*
BY
*Arnold and Mathis*
ATTORNEYS Dec. 11, 1951     E. A. DAVIS     2,577,952
DISK PLOW
Filed July 2, 1945     4 Sheets-Sheet 4
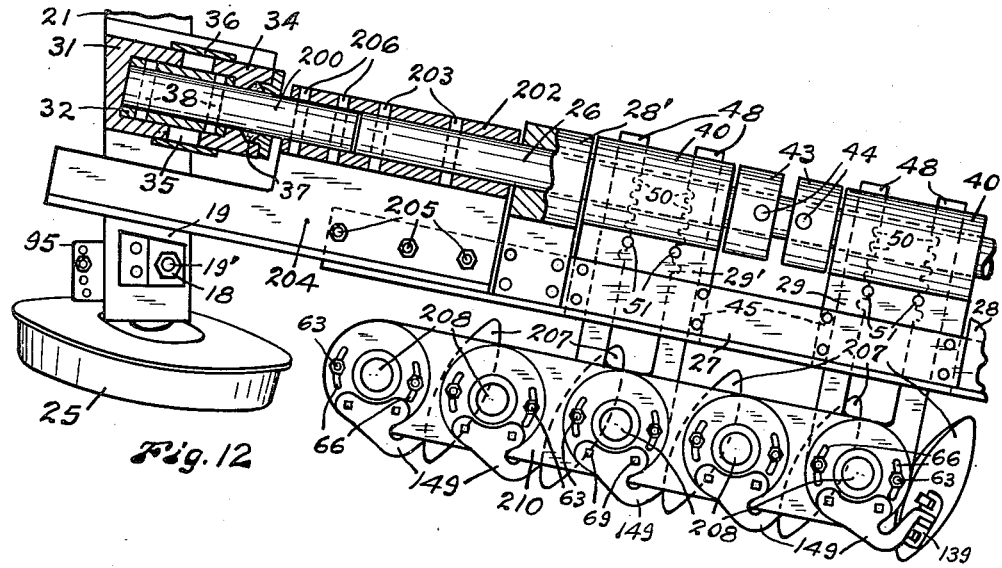
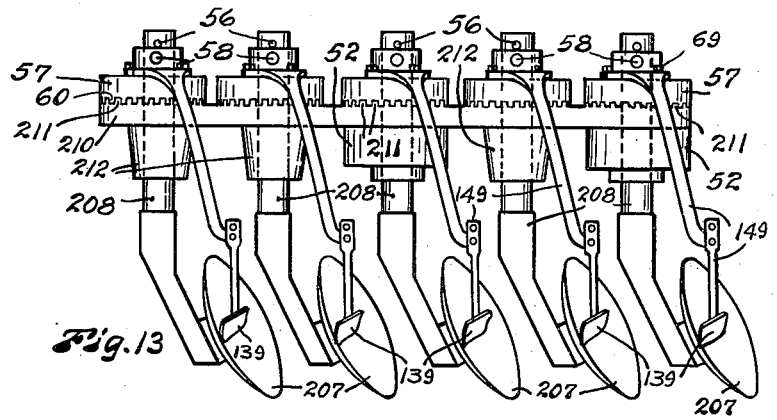
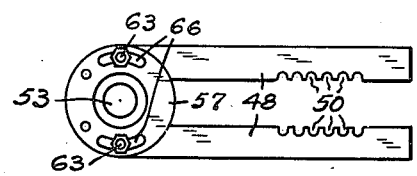
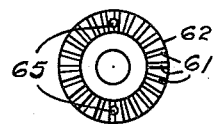
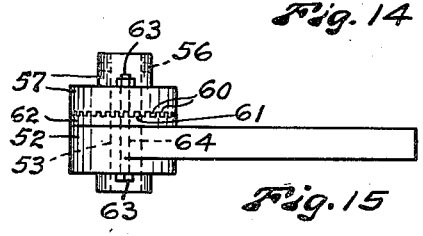
INVENTOR.
*Enoch A. Davis*
BY
*Arnold and Mathis*
ATTORNEYS Patented Dec. 11, 1951

2,577,952

UNITED STATES PATENT OFFICE 2,577,952

DISK PLOW

Enoch A. Davis, Seattle, Wash.

Application July 2, 1945, Serial No. 602,747

10 Claims. (Cl. 97—53)

This invention relates to an agricultural machine and particularly to a disk plow and an object of this invention is to improve agricultural machines of this type and to increase the efficiency of the same.

Another object is to provide means for applying a draw bar pull to a disk plow in such a manner that the pull tends to hold the plow disks in the ground and also tends to offset the side draft incident to the relative pressure of the ground against the plow disks.

Another object is to provide a disk plow in which a plow frame is pivotally supported by a front bolster and a rear bolster and carries plow disks positioned at one side of the pivotal axis of said plow frame and in which a draft means is adjustably connected with the plow frame at a location near the plow disks and between the plow disks and the pivotal axis of the plow frame.

Another object is to provide a disk plow having a tilting frame carrying plow disks and having novel and efficient power operated means for tilting said frame to lift said plow disks out of the ground.

Another object is to provide efficient scraper means for keeping the dirt cleaned off of the plow disks without danger of injuring the disks.

Another object is to provide highly efficient dirt excluding bearings for use in a plow, or agricultural machine of this type, or other types of machines where similar problems exist in whole or in part.

The above mentioned general objects of my invention, together with others inherent in the same, are attained by the device illustrated in the following drawings, the same being preferred exemplary forms of embodiment of my invention, throughout which drawings like reference numerals indicate like parts.

Figure 1 is a side elevation of a disk plow constructed in accordance with this invention;

Fig. 2 is a view with parts shown in plan and parts shown in section substantially on broken line 2—2 of Fig. 1;

Fig. 3 is a rear elevation showing the rear axle or bolster and rear wheel structure of this plow;

Fig. 4 is a view partly in section and partly in elevation taken substantially on broken line 4—4 of Fig. 2 and showing the front axle or bolster and front wheel structure of this plow;

Fig. 5 is a somewhat diagrammatic detached view with parts shown in elevation and parts shown in section substantially on line 5—5 of Fig. 2, showing apparatus used on this plow for lifting and supporting the plow disks clear of the ground, parts being omitted and parts that would not appear along section line 5—5 being shown diagrammatically by dot and dash lines;

Fig. 6 is a fragmentary sectional view with parts in elevation and parts broken away showing portions of the plow lifting means;

Fig. 7 is a view in cross section through the plow frame and hitch means taken substantially on line 7—7 of Fig. 2;

Fig. 8 is a fragmentary detached sectional view taken through the bearing of one of the plow wheels, showing dirt excluding bearing means used in connection with this plow;

Fig. 9 is a view of said bearing means taken substantially on broken line 9—9 of Fig. 8;

Fig. 10 is a fragmentary sectional view through the bearing of a plow disk showing a dirt excluding bearing structure;

Fig. 11 is a fragmentary sectional view showing scraper means used in connection with this plow to clean the plow disks;

Fig. 12 is a fragmentary plan view with parts in section, showing means for extending or lengthening this plow frame and means for operatively supporting thereon a plurality of plow disks of smaller diameter than the disks shown in Figs. 1 to 4;

Fig. 13 is a side elevation of the multiple disk assembly shown in Fig. 12;

Fig. 14 is a detached plan view of the type of plow disk supporting beam shown in Figs. 1, 2, 12 and 13;

Fig. 15 is a detached side elevation of said plow disk supporting beam; and

Fig. 16 is a detached plan view of an adapter member used in connection with the beam shown in Figs. 14 and 15 when said beam is used for supporting disks in the manner shown in Figs. 1 and 2.

This plow includes a front axle means or bolster 20 and a rear axle means or bolster 21 supported by four wheels 22, 23, 24 and 25. The wheels 22 and 24 are land wheels and adapted to run on unplowed land. The wheels 23 and 25 are furrow wheels. The two bolsters 20 and 21 are substantially parallel and are transversely offset relative to each other. They are connected with each other by diagonally positioned plow frame means. This plow frame means comprises a longitudinally extending coupling shaft or member 26 that is connected with a longitudinally extending angle bar 27 by transverse frame members 28, 28', 29 and 29'. The respective forward and rear end portions of the coupling or shaft member 26 are pivotally connected by aligned diagonal bearing means with the front bolster 20 and rear bolster 21. One preferred way of making these pivotal connections is to secure two spaced apart aligned bearing members 30 and 33 to the front bolster 20 diagonally thereof and to secure two similar aligned spaced apart bearing members 31 and 34 to the rear bolster 21 diagonally thereof. The front bearing members 30 and 33 and rear bearing members 31 and 34 are coaxial. All of the bearing members 30, 31, 33 and 34 are counterbored for the reception of sleeves 32 that are fixedly secured, as by pins 38, on the respective end portions of the coupling shaft 26. The ends of sleeves 32 and ends of coupling shaft 26 cooperate with the bearing members 30, 31, 33 and 34 to resist end thrust.

The chambers or pockets 35 between the two front bearing members 30 and 33 and between the two rear bearing members 31 and 34 constitute grease pockets and are covered by jacket members 36. Preferably packing devices 37 are provided at the end of each of the bearings 33 and 34 to prevent escape of grease along the shaft 26.

When the plow is in operation the angle bar 27 is adapted to rest on adjustable supports 19 that are in duplicate, one at the front bolster 20 and the other at the rear bolster 21. The supports 19 are carried by bolts 19' and are adjustable by nuts 18. The depth of cut of the plow disks is determined by the adjustment of the supports 19. Figs. 1, 3 and 4 show these supports set for a maximum depth of cut. Means independent of the supports 19 are provided for raising and lowering the plow frame, as hereinafter described.

The two frame members 29 and 29' have rigidly connected tubular sleeve members 40 that fit over the coupling member 26 and are rotatably mounted thereon. The frame members 28 and 28' also fit rotatively over the coupling member 26. Preferably the ends of the sleeve members 40 are provided with outwardly extending cylindrical bosses 41 of smaller diameter than the members 40. Two of the bosses 41 are adapted to fit within suitable cup shaped recesses 42 in the frame members 28 and 28' and the other two bosses 41 are adapted to fit within similar recesses in cap members 43. Thus dirt excluding connections are provided. The cap members 43 are rigidly secured to the coupling shaft 26, as by pins 44 and serve as end thrust bearings for the tubular sleeve members 40.

The frame members 29 and 29' have downwardly extending flanges 45 along their outer edges, see Fig. 7, and have a common bottom plate 46 secured thereto as by bolts 47. The plate 46 and flanges 45 cooperate with the frame members 29 and 29' to form guideways for the side members 48 of U-shaped plow supporting beams, see Figs. 1, 2, 3, 4, and 15. Also, the plate 46 serves as a member to which draw bar hitch means may be adjustably connected as hereinafter explained.

The beam members 48 are provided with notches 50, see Figs. 2 and 14, for the reception of readily removable pins 51 by which the beam members 48 are secured to the frame members 29 and 29' in such a manner as to be readily longitudinally adjustable thereof for the purpose of adjusting implements that are supported by said beam members.

Each pair of beam members 48 has a hub 52, Figs. 2 and 15, rigid with the outer ends thereof.

Each hub 52 is provided with a vertical bore 53 for the reception of an upright shank 54. A soil cultivating implement, such as a concavo-convex plow disk 55 is supported from the lower end portion of each shank 54, preferably by dirt excluding bearing means of a type shown in Fig. 10.

Each shank 54 is adjustably supported in its hub 52, both as respects its vertical and angular position in said hub. One way of obtaining this adjustment is to provide a plurality of vertically spaced transverse holes 56 near the upper end of each shank and to secure a hubbed disk 57 (see also Fig. 15) to each shank by a bolt or pin 58 (see Fig. 1) that passes through one of the holes 56. Each disk 57 has teeth 60 on its bottom surface that interlock with other teeth 61 on adapter disks 62, Figs. 15 and 16, that rest on the hubs 52. Bolts 63 extend vertically through holes 64 in the hubs and holes 65 in the disks 62 and slots 66 in the hubbed disks 57 (see Figs. 14, 15, and 16). These bolts 63 secure the hubbed disks 57 to the hubs 52 in such a manner that said hubbed disks 57 and the shanks 54, to which they are secured, can be angularly adjusted to position the plow disks 55 at a desired angle. It will be noted that the adapter disks 62 are not used in the structure shown in Figs. 12 and 13.

For the purpose of deflecting the dirt off of the plow disks 55 and keeping said plow disks clean I provide, for each plow disk, a curved scraper 39. Each scraper 39, Fig. 11, has a sharp edge 39' that is positioned in close proximity to, but not in gouging contact with, the plow disk. Each scraper 39 is adjustably supported by a bracket member 49. Each bracket 49 is rigidly connected, as by cap screws 69 (Fig. 2) with a support, as with the hubbed disk 57 that is positioned on top of the hub 52 of one of the plow beams 48.

To make it possible to position the sharp edges 39' of the scrapers 39 in very close proximity to the faces of the plow disks 55 without danger of having said sharp edges 39' gouge into the plow disks 55, I provide on the back of each scraper 39 two or more spaced apart guard members 59. Each guard member 59 has a surface 59' of substantial area that conforms substantially to the shape of the plow disk and is adapted to engage with and rest on the plow disk in such a manner as to insure proper positioning of the sharp edges 39' of the scrapers and to prevent said sharp edges from gouging into the plow disks. These guard members 59 thus overcome an objectionable fault heretofore present in the operation of scrapers of this type.

The dirt excluding bearing means for each plow disk 55, see Fig. 10, includes a plate 67 secured as by rivets 68 to the plow disk 55. Each plate 67 has a rearwardly extending hub 70 that is provided with an outwardly extending annular dirt excluding flange 71. Each hub member 70 is positioned in a dirt excluding housing 72 of inverted U shape that is secured to the lower end portion of the shank members 54.

A bearing axle or spindle 73 is rigidly secured to the hub 70 and extends rearwardly therefrom through an opening in the back wall of the housing member 72 and through packing means 74 into a bearing box or chamber 75 in the lower end portion of the shank 54. A portion 76 of the bearing axle 73 is of larger diameter than the remainder of said axle to cooperate in the provision of thrust bearing means. The rear end portion of said shank also cooperates in providing thrust bearing means and is further rounded or tapered in the manner shown in Fig.

10 to provide ample room for grease which may be introduced under pressure through a standard grease fitting 84 of check valve type.

The bearing for each of the plow wheels 22, 23 and 25 is of the type shown in Figs. 8 and 9. The land wheel 24 is a power wheel and has a bearing of different type as shown in Fig. 6. Referring to Figs. 8 and 9 which show the bearing means for wheels, as the front land wheel 22, there is shown hub members 77 and 78 secured to wheel 22, as by bolts 80. The wheel 22 and hub members 77 and 78 are rotatively mounted on a bearing axle or spindle. This axle preferably comprises two end portions 81 and 82 of smaller diameter operatively disposed in hub members 77 and 78 respectively and a medial portion 83 of larger diameter operatively disposed in the wheel 22 between the hub members 77 and 78. The larger axle member 83 serves as a combined radial and thrust bearing for the wheel 22, and the parts 22, 77 and 78 form a bearing box. The hub member 77 functions as a grease housing and has a standard grease fitting 84 connected therewith. The hub member 78 extends into a dirt excluding housing 85 of inverted U shape. A nut 86, of larger external diameter than the portion of the hub 78 adjacent to said nut, is threaded onto said hub 78. This nut 86 provides an annular dirt excluding shoulder which helps to prevent dirt from gaining access to the bearing through the nut 86 and around the axle member 82. Preferably packing 87 is provided within the nut 86 to retard leakage of grease. The axle part 82 extends into and is rigidly secured to a bearing block 88.

The bearing block 88 has vertically aligned upper and lower pivot members 90 and 91 that are pivotally mounted respectively in the front bolster 20, Fig. 4, and in an angle bracket 92 that is rigid with said front bolster.

The furrow wheels 23 and 25 are mounted on bearing blocks 93 and 94 respectively, Figs. 4 and 3, that are similar to the bearing block 88 and are similarly mounted on vertical pivot means 90 and 91 in the front axle 20 and rear axle 21 and in brackets 92.

The dirt excluding bearing means for each of the furrow wheels 23 and 25 is similar to that shown in Figs. 8 and 9 and just hereinbefore described except that the bearing axle or spindle of each of said furrow wheels 23 and 25 is preferably secured to its bearing block at an incline as indicated by dotted lines in Figs. 4 and 3. This incline of the spindles is such that it causes the furrow wheels 23 and 25 on the right hand side of the plow to tilt outwardly at the top. This tilting of wheels 23 and 25 makes them more efficient in resisting side draft.

The bearing block 94 which carries the spindle for the right rear wheel 25, Figs. 2 and 3, is adjustable on its vertical axis so that the degree of toe-out of this rear wheel 25 can be adjusted. To provide for this adjustment two plates 95 and 96 are rigidly secured respectively to the rear bolster 21 and to the bearing block 94. The plates 95 and 96 are disposed in face to face relation so that they can be slidably moved relative to each other by angular movement of said block 94 relative to the rear bolster 21. At least one of said plates, such as plate 95, is provided with a plurality of holes 97 for the reception of a bolt 98 which passes through both plates. Adjustment is had by removing the bolt 98 and replacing it in selected holes.

The left rear wheel 24 is used as a power wheel to furnish power for lifting the plow disks 55 clear of the ground. This wheel 24, Fig. 3, is secured to an axle shaft 100 that is journaled in a bracket or block 101. The block 101 is adjustably mounted by vertical pivots 102 and 103 in the rear bolster 21 and in a bracket 104. The pivot member 102 is keyed or otherwise rigidly and non-rotatively secured to a bracket 105, Fig. 2, on top of the rear bolster 21. The bracket 105 is adjustably secured to said rear bolster 21, as by bolts 106 operating in slots 107 in the bracket 105.

The inner end of the axle shaft 100 extends into a cylindrical shell, Figs. 3, 5 and 6, formed of two spaced apart plates 110 and 111 that are rigidly connected together by an annular marginal spacer member 112. The plate 110 is rotatively mounted on the axle shaft 100. The plate 111 is rigidly connected with a short shaft 113 that is journaled in a bracket 114 which is rigid with the block 101. A ratchet member 115 with preferably one tooth 116 thereon is secured to the end portion of the axle shaft 100 between the plates 110 and 111. An L-shaped pawl 117, Fig. 5, is mounted between the plates 110 and 111 on pivot means 118 and is provided with a hook shaped part 120 adapted to engage with the tooth 116 of the ratchet member 115 to lock the shell formed by members 110, 111 and 112 to the axle shaft 100. The pawl 117 has an outwardly protruding end portion 121 that is adapted to be engaged by a lever member 122 to move the hook 120 of said pawl into engagement with tooth 116 of the ratchet member 115. The portion 121 is further adapted to strike against a trip member 123 to release said hook from the tooth 116 after the plow disks 55 have been raised clear of the ground. A tension spring 124, shown in Fig. 3 and shown diagrammatically by dotted lines in Fig. 5, is connected with the end portion 121 of the pawl 117 and is positioned so that its line of pull will be on one side of the axis of the pivot 118 when the pawl 117 is disengaged from the ratchet member 115 and will be on the other side of the axis of said pivot 118 when the pawl 117 is engaged with the ratchet member 115. The spring 124 will thus yieldingly hold the pawl 117 in either an engaged or disengaged position relative to ratchet member 115 and the pawl will be readily released from the tooth 116 when arm 121 encounters the stop 123.

The bracket 104 is provided with a relatively large opening 125, Fig. 6, through which the short shaft 113 passes. This opening 125 affords room for swinging movement of the short shaft 113 when the left rear wheel 24 is angularly adjusted.

The short shaft 113 is connected by a universal joint 126, Figs. 3 and 6, with an upwardly inclined shaft 127. This shaft 127 is connected by a universal joint 128 with a horizontal shaft 130. The shaft 130 may be of square cross section as shown in Fig. 6. Said shaft 130 is slidably connected with the hub portion 131 of a lifting arm 132. The slidable connection of shaft 130 with hub portion 131 provides for turning hub portion 131 whenever shaft 130 is rotated but leaves the shaft 130 longitudinally movable in the hub 131 to permit angular adjustment of the block 101 and left rear wheel shaft 100. Hub 131 is journaled in bearing means 133 that is rigid with the rear bolster 21.

The outer end portion of the lifting arm 132, Figs. 2 and 5, is provided with a roller 134 that is adapted to engage with the angle bar 27 and exert a lift thereon when said lifting arm 132 is angularly moved by the power wheel 24.

Power to exert a lift on the forward end portion of the angle bar 27 is also taken from the source that angularly moves the lifting arm 132. This is accomplished by providing on the hub 131 a downwardly extending lever arm 135 that is connected by link means 136 with another lever arm 137 on a shaft 138. The shaft 138 is further provided with a second lever arm 140 which is connected by a flexible cable 141 with a lever arm 142 on a front lifting shaft 143 that is journaled in the front bolster 20. The front lifting shaft 143 carries a front lifting arm 144 provided with a roller 145 that engages with the front end portion of the angle bar 27 and is adapted to exert a lift thereon. Lifting arms 132 and 144 and parts connected therewith are shown diagrammatically by dot and dash lines in Fig. 5.

The cable 141 passes over two sheaves 146 and 147 that are supported from brackets 148. The brackets 148 are secured to the members 40 and extend sidewise therefrom and support the sheaves 146 and 147 a substantial distance above the line of pull of the cable 141. When the power from wheel 24 is applied to lift the plows it will draw the cable 141 taut. This will exert a downward pull on the brackets 148. At the same time a lifting force is being applied to the angle bar 27. This tends to tilt the plow frame upwardly about the axis of the main shaft 26 and provides a better balanced and more efficient lifting arrangement than would be provided if the sheaves 146 and 147 and brackets 148 and parts connected therewith were omitted.

To hold the plow frame and disks in a raised position I preferably provide on the hub portions of the two lever arms 140 and 142 teeth 150 and 151 respectively that are adapted to be engaged by bell crank shaped latch members 152 and 153 respectively. Latch members 152 and 153 are fulcrumed on pivots 154 and are connected with each other for simultaneous operation by cable means 155.

A trip line 156 is connected with the forward bell crank shaped latch member 153 and may extend to the tractor by which the plow is drawn for convenient manipulation by the tractor driver so that he can either raise or lower the plows easily.

The rear bell crank shaped latch member 152 is connected by a tension spring 157 with a bell crank lever 158. The bell crank lever 158 is mounted on a fulcrum 160 and connected by a link member 161 with the pawl operating lever 122. Another tension spring 162, stronger than the spring 157, has one end connected with the bell crank lever 158 and the other end connected with a bracket 163 rigid with rear bolster 21. Also, a normally slack flexible tie member 164, such as a piece of cable, connects the upper end portions of bell crank lever 158 and latch member 152 in such a manner as to limit the elongation of spring 157. Angular movement of bell crank member 158 in the direction in which it is urged by spring 162 is limited by engagement of said member 158 with the rear bolster 21.

The draw bar or hitch means used to pull the plow, Figs. 1 and 2, is adjustably connected directly with the plow frame members 26 and 27 approximately midway between the front and rear wheels adjacent the plow disks 55. Also, this draw bar means is connected with the plow frame at a high enough elevation so that it will exert a downward pull on the plow frame and thus tend to draw the plows into the ground. This draw bar means is further arranged so that it will exert a force tending to offset the side draft of the plows and tending to swing the rear end portion of the plow frame in a direction toward the plow disks.

The hitch means includes a rear draw bar of adjustable length, Fig. 7, comprising two sections 165 and 166 secured together by bolts 167. The bolts 167 are adjustable into different holes 168 to provide for variations in the length of the draw bar. The rear end of draw bar section 165 is connected by universal joint means 170 with a shank 171. The shank 171 is adapted to extend through one of holes 172 in a bracket 173 and has nut and washer means 174 on the rear end portion thereof.

A plurality of the holes 172 are provided in bracket 173 in spaced relation transversely and vertically of the plow frame so that any desired lateral or vertical adjustment of the shank 171 in the bracket 173 may be obtained. The bracket 173 is adjustably secured to the plate 46 as by cap screws 175 that screw into threaded holes 176. A plurality of the holes 176 are provided in spaced apart relation longitudinally of the plow so that the bracket 173 may be adjusted longitudinally of said plow.

The forward end portion of the draw bar member 166, see Fig. 4, extends through a certical slot 177 in an adjustable guide member 178 that is positioned beneath the front bolster 20. The guide member 178 is supported on a nut means 180 and the nut means 180 is threaded onto a screw member 181. The screw member 181 is rotatively supported by bearing means rigid with the front bolster 20 and has a head 182 by which it may be turned to move the nut means 180 longitudinally of the screw 181 and transversely of the plow. The nut means 180 slidably engages with a guide member 183 which prevents such nut means from rotating with the screw 181 but allows it to move along the screw 181 when said screw is rotated. The guide member 178 is free to swing on the nut means 180 in a direction longitudinally of the plow but cannot swing transversely of the plow. This guide member 178 thus forms a transversely adjustable fulcrum against which the draw bar 166 presses when tension is exerted on said draw bar.

Just forwardly of the guide member 178 the draw bar 166 is connected by universal joint means 184 with another draw bar member 185, Figs. 1 and 2. The forward end of the draw bar member 185 is adapted to be connected as by means 186 with a prime mover 187 (as a tractor), a fragment of which is shown in Figs. 1 and 2.

The steering means for the front plow wheels includes two brackets 190 and 191 rigidly connected with the wheel supporting blocks 88 and 93 respectively and connected with each other by a cross rod 192 having a turnbuckle 193 therein for adjustment. Another rod 194 having a turnbuckle 195 therein connects the bracket 191 with the draw bar 185 at a point a substantial distance forwardly of the universal joint 184. Turning movement of the prime mover 187 will operate through rods 192 and 194 to steer the front wheels of the plow in an obvious manner.

Figs. 12 and 13 show a construction in which the plow frame shown in Figs. 1 to 4 is elongated to make room for a greater number of plow disks that are shown in the previous figures. These are numbered 201 and require a greater over all length between the front and rear wheels.

To extend or elongate the plow frame, as shown in Figs. 12 and 13, the rear bearing member 34 is removed so as to detach the rear bolster 21 and its wheels as a unit. The rear sleeve 32 is removed from the shaft 26 and put onto an extension shaft 200 and said sleeve 32 and the extension shaft 200 are replaced in the rear bearings 31 and 32. A tubular sleeve 202 is slipped over the rear end portion of the coupling shaft 26 and rigidly secured thereto by cross pins or bolts 203 which fit in the holes already provided in said shaft. A plate 204 that is rigid with the sleeve 202 is secured, as by bolts 205, to the rear end portion of the angle bar 27. The forward end portion of the extension shaft 200 is fitted into the sleeve 202 and secured therein by pins or bolts 206. The sequence of the above described operations required in assembling the extension parts to provide a complete and operative plow chassis of greater length may be varied. Also it will be understood that the plow chassis may be lengthened by substituting frame means of greater length for the frame shown in Figs. 1 to 4 inclusive, using the wheel and bolster structure of Figs. 1 to 4.

The extended plow frame is capable of accommodating the longer assembly of plow disks 207. The plow disks 207 are of smaller diameter than the disks 55 and are better adapted for shallow cultivation. Each disk 207 is mounted on a shank 208 by dirt excluding bearing means of a type previously described and shown in Fig. 10. The shanks 208 are similar to the previously described shanks 54. Also each plow disk 207 has a scraper 139 supported by a bracket 149 both of which are similar to parts 39 and 49 that have been previously described.

The shanks 208 are all supported in a bar or plate 210 and the plate 210 is supported on the hub portions 52 of the two plow beams shown in Figs. 1, 2, 7, 14 and 15. Preferably the toothed adapter disks 62, Fig. 16, are removed before the plate 210 is placed on the plow beams. Also, preferably gear teeth 211 are provided on the top side of the plate 210 for cooperation with the gear teeth 60 of hubbed disks 57 of a type hereinbefore described by which the shanks 208 are secured to the plate 210.

Two of the shanks 208, see the first and third shanks 208 from the right, Figs. 12 and 13, extend up through the hubs 52. The other shanks 208 extend up through bosses 212 on the plate 210.

In the operation of this machine the depth of cut is determined by adjustment of the supports 19 on which the angle bar 27 rests. The reaction of the plow disks 55 against the ground results in a side draft tending to move the running gear of the plow to the left as it moves forwardly. Also, the plow disks may encounter trash on the ground or patches of hard or packed ground that will tend to lift said disks out of the ground.

The hitch of the draw bar to the plow frame tends to pull the plows 55 into the ground because the point of attachment of the draw bar to the plow is above the point of attachment of said draw bar to the tractor and the tractor pulls at a downward incline on the plow frame.

Also the point of connection of the draw bar with the plow frame is to the left of the axis of the coupling member 26 and for this reason the pull of the draw bar tends to resist the side draft and tends to swing the rear end portion of the plow frame to the right or toward the plow disks. The pull of the draw bar is exerted on the plow frame at a point near the plow disks and to the rear of the front wheels. Thus strain and wear on the front wheel assembly is minimized.

If the plow disks strike an obstruction which raises them out of the ground they will not lift the plow wheels but will merely swing the plow frame upwardly about the pivotal axis of the coupling member 26 and will drop back as soon as they have cleared the obstruction. Also the running gear (including the wheels, bolsters and shaft 26) has substantial weight and will follow the ground even though frame 27 and parts connected therewith angularly move. Also the frame 27 and the plow disks will rapidly return to plowing position and not leave substantial amounts of unplowed ground.

The bolsters 20 and 21 are both free to move angularly about the axis of the coupling member without subjecting this coupling member to a twisting strain.

If the machine is to be moved on the road adjustments of the wheels may be made so that these wheels will run substantially straight with the rear wheels following approximately in line with the front wheels.

Obviously, changes may be made in the forms, dimensions, and arrangement of the parts of my invention, without departing from the principle thereof, the above setting forth only preferred forms of embodiment.

I claim:

1. In an agricultural machine, two substantially parallel transversely offset bolsters; two axially aligned bearing members secured to the respective bolsters diagonally thereof; a rigid coupling member extending diagonally between said two bolsters and having its two end portions rotatively supported in said axially aligned bearings; an implement carrying frame pivotally supported on said coupling member and extending sidewise therefrom; disc plows carried by said implement carrying means and aligned with said coupling member; and wheels carried by said bolsters and angularly directed toward a furrow being plowed by said disc plows.

2. In an agricultural machine, two substantially parallel transversely offset bolsters; two axially aligned bearing members secured to the respective bolsters diagonally thereof; a rigid coupling member extending diagonally between said two bolsters and having its two end portions rotatively supported in said axially aligned bearings; an implement carrying frame pivotally supported by said coupling member and extending sidewise therefrom; beam means adjustably carried by said implement carrying frame and adjustable transversely of the machine; implements carried by said adjustable beam means; and draw bar means connected with said implement carrying frame adapted to exert a forward and downward pull thereof.

3. In an agricultural machine, two substantially parallel transversely offset bolsters; two axially aligned bearing members secured to the respective bolsters diagonally thereof; a rigid coupling member extending diagonally between said two bolsters and having its two end portions rotatively supported in said axially aligned bearings; an implement carrying frame pivotally supported by said coupling member and extending sidewise therefrom; beam means supported by said implement carrying frame and adjustable transversely of the machine; draw bar means for said machine; and bracket means adjustably connecting said draw bar means with said implement carrying frame providing adjustment of the location of connection of said draw bar means both longitudinally and transversely of the machine.

4. In an agricultural machine, two spaced apart bolsters; wheels carrying said bolsters; two axially aligned bearing members supported by the respective bolsters; a coupling member having its end portions rotatively supported in said axially aligned bearing members; implement carrying means connected with said coupling member extending to one side thereof and rotatively movable about the axis of said bearing members; ground cultivating implements carried by said implement carrying means; and draw bar means connected with said implement carrying means at a point between said implements and the pivotal axis of said coupling member whereby tension on said draw bar means will tend to swing the rear end portion of said machine in a direction toward said implements.

5. In a plow, spaced apart transversely offset front and rear bolsters; wheels carrying said bolsters; two axially aligned bearing members supported by the respective bolsters; a coupling member having its end portions rotatively supported in said axially aligned bearing members; frame means connected with said coupling member extending to one side thereof and rotatively movable about the axis of said bearing members; plow disks carried by said frame means positioned to exert a side thrust in a direction toward said coupling member; draw bar means adjustably connected with said frame means between the pivotal axis of said coupling member and said plow disks, whereby a forward pull on said draw bar means will tend to swing the rear end portion of said plow in a direction toward said plow disks; and a guide member on said front bolster for said draw bar.

6. In an agricultural machine, two substantially parallel transversely offset bolsters; wheels carrying said bolsters; two axially aligned bearing members secured to the respective bolsters diagonally thereof; a rigid coupling member extending diagonally between said two bolsters and having its end portions rotatively supported in said axially aligned bearing members; implement carrying means connected with said coupling member and extending sidewise therefrom; a lifting member mounted on at least one of said bolsters and connected with said implement carrying means; and actuating means powered by at least one of said wheels and connected with said lifting member.

7. In an agricultural machine, two spaced apart bolsters; wheels carrying said bolsters; two axially aligned bearing members supported by the respective bolsters; a coupling member having its end portions rotatively supported in said axially aligned bearing members; implement carrying means connected with said coupling member extending to one side thereof and rotatively movable about the axis of said bearing members; lever means connected with said implement carrying means extending to the other side of said coupling means; a lifting member mounted on at least one of said bolsters and connected with said implement carrying means; and actuating means powered by at least one of said wheels and connected with said lifting member.

8. In an agricultural machine, spaced apart front and rear bolsters; wheels carrying said bolsters; two axially aligned bearing members supported by the respective bolsters; a coupling member having its end portions rotatively supported in said axially aligned bearing members; a frame bar positioned to one side of said coupling member and arranged to overlap both of said bolsters; frame means connecting said bar with said coupling member and rotatively movable about the axis of rotation of said coupling member; two lifting members mounted in the front and rear bolsters respectively arranged to exert an upward thrust on said frame bar; actuating means powered by a rear wheel of said machine and directly connected with the lifting member in the rear bolster; means including a flexible connector extending from the rear bolster to the front bolster and connected with the lifting member in the front bolster; lever means on said frame means extending to the side of said coupling member opposite said frame bar; and sheaves carried by said lever means receiving said flexible connector and positioned above the normal line of pull of said flexible connector whereby a down pull will be exerted on said lever means when tension is exerted on said flexible connector.

9. In an agricultural machine, two spaced apart bolsters; wheels carrying said bolsters; two axially aligned bearing members supported by the respective bolsters; a coupling member having its end portions rotatively supported in said axially aligned bearing members; a frame bar positioned to one side of said coupling member and overlapping both of said bolsters; frame means connecting said frame bar with said coupling member and rotatively movable about the axis of said coupling member; ground engaging implements carried by said frame means; vertically adjustable supports carried by said two bolsters for engagement by said bar to limit the downward movement of said implements; two lifting members mounted in said two bolsters for lifting engagement with said bar; and means powered by a wheel of said machine for actuating said lifting members.

10. In an agricultural machine, two substantialyl parallel transversely offset bolsters; two axially aligned bearing members secured to the respective bolsters diagonally thereof; a rigid coupling member extending diagonally between said two bolsters and having its two end portions rotatively supported in said axially aligned bearings; an implement carrying frame pivotally supported by said coupling member and extending sidewise therefrom; beam means supported by said implement carrying frame and adjustable transversely of the machine; disc plows carried by said beam means and aligned with said coupling member; and wheels carried by said bolsters and angularly directed toward a furrow being plowed by said disc plows.

ENOCH A. DAVIS.

REFERENCES CITED

The following references are of record in the file of this patent:

UNITED STATES PATENTS

| Number | Name | Date |
|---|---|---|
| 423,032 | Deuscher et al. | Mar. 11, 1890 |
| 1,216,123 | Howe | Feb. 13, 1917 |
| 1,301,628 | Weaver | Apr. 22, 1919 |
| 1,472,768 | Dickinson | Oct. 30, 1923 |
| 1,780,955 | Toth | Nov. 11, 1930 |
| 2,113,556 | De Rocher | Apr. 5, 1938 |
| 2,155,739 | Seaholm | Apr. 25, 1939 |
| 2,247,865 | Hipple | July 1, 1941 |
| 2,356,770 | Lohman | Aug. 29, 1944 |